Patented May 27, 1947

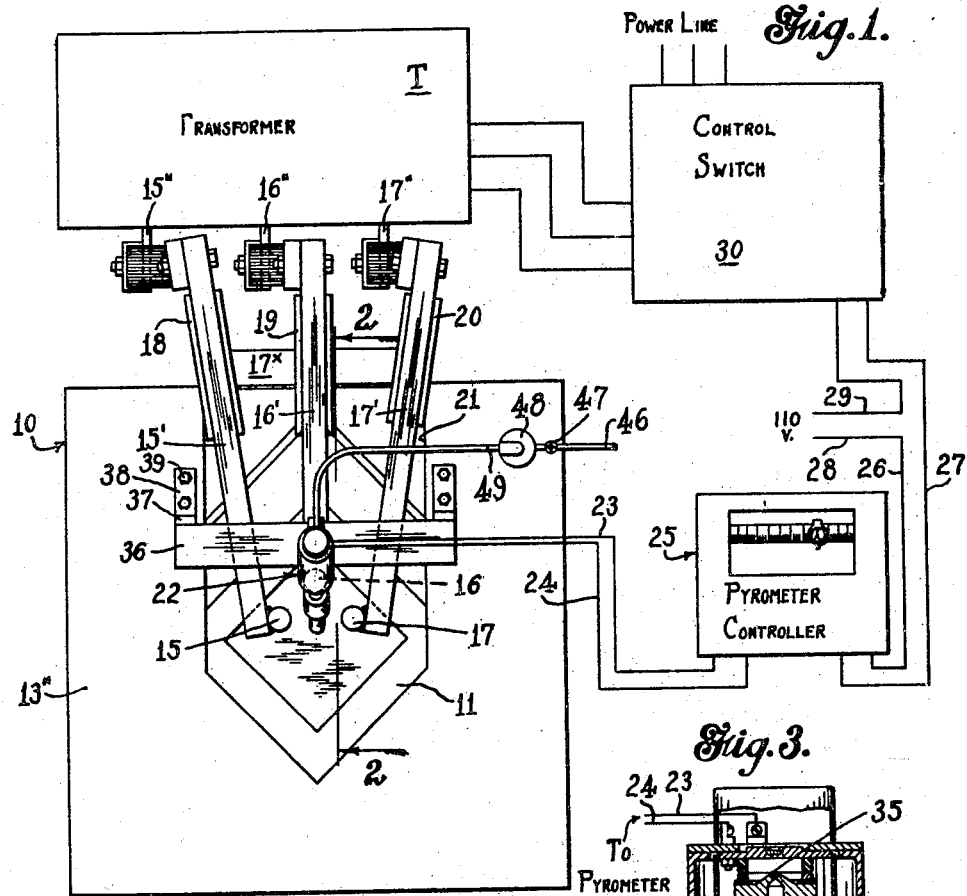
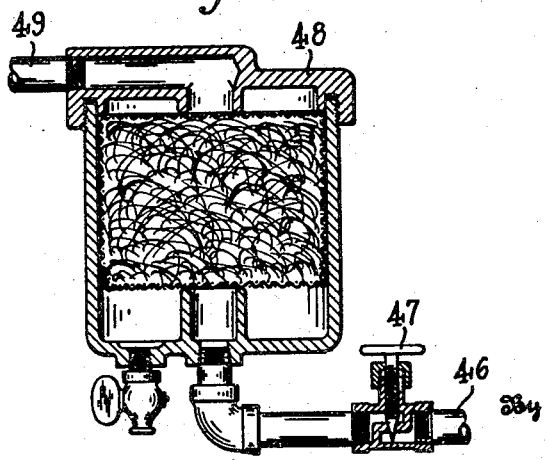

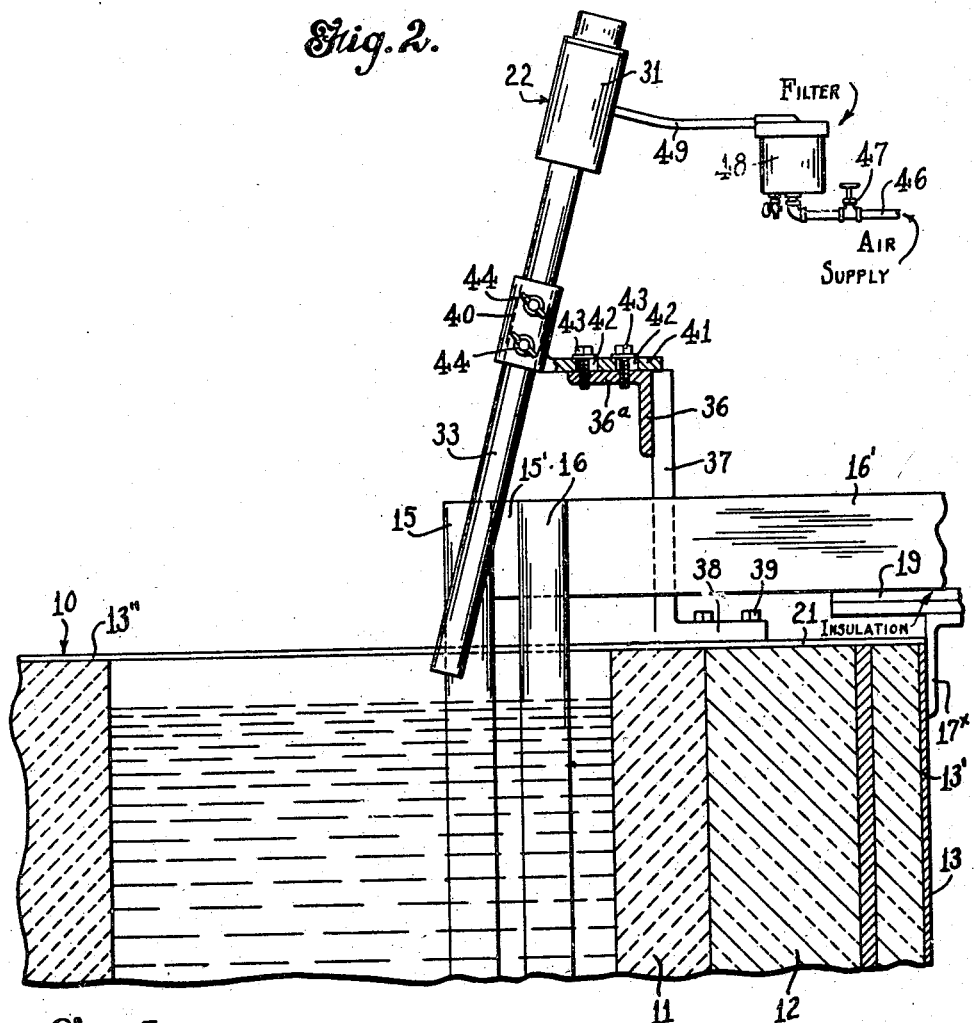
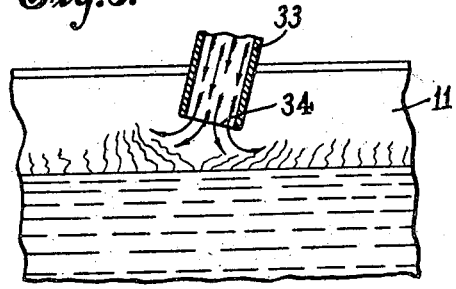

2,421,224

UNITED STATES PATENT OFFICE 2,421,224

FURNACE FOR HEAT TREATMENT OF METAL

Haig Solakian, New Haven, Conn., and Chester M. Vincent, Detroit, Mich., assignors to Artemas F. Holden, New Haven, Conn.

Application May 19, 1943, Serial No. 487,576

4 Claims. (Cl. 13—23)

This invention relates to furnaces for the heat treatment of metal and more particularly to furnaces of the salt-bath type in which a charge of salts contained in a suitable pot is heated to a high temperature, usually in excess of 2000° F., for the heat treatment of steel articles which are treated by subjecting them to immersion for a time in the fused or molten mixture of salts.

In operations of this kind it is highly important to have effective control of the bath temperature and to be able to maintain the temperature within a comparatively narrow range as operations of the furnace on successive batches of steel are continued, and it is one of the objects of our invention to provide apparatus whereby the desired control of temperature can be attained.

Another object is to provide improved, durable, satisfactorily operating means requiring a minimum of attention for maintaining the temperature of the salt bath within narrow limits.

The invention also contemplates the provision of a new method of controlling the temperature of salt bath furnaces.

To these and other ends the invention consists in the novel features and procedures to be hereinafter described and finally pointed out in the claims.

In the accompanying drawings:

Fig. 1 is a diagrammatic plan view of a salt bath furnace provided with our improvements;

Fig. 2 is an enlarged vertical sectional view taken on line 2—2 of Fig. 1, of a portion of the furnace, the showing of the air connections being somewhat diagrammatic;

Fig. 3 is a detail view showing the ray collecting tube in longitudinal section;

Fig. 4 is a sectional view showing the filter and the reducing valve in the compressed air line; and Fig. 5 is a fragmentary view showing the relation of the lower end of the sighting tube to the bath;

In Fig. 1 of the drawings the furnace proper is shown at 10, and this is a salt bath furnace of the pot type heated, in this case, by three-phase alternating current. The furnace has a pot 11, preferably of ceramic material, which pot is substantially square in the preferred form and is encased up to its upper margin in a refractory body 12, having an outer metal jacket 13. A vertical wall of the metal jacket is shown at 13' and the upper wall of the jacket is shown at 13''.

Immersed in the salt bath 14 in the pot are suitable heating electrodes, and in the present instance there are three electrodes indicated, respectively, at 15, 16, and 17, each comprising preferably a bar of nickel or nickel-chromium alloy, or iron. Each electrode preferably extends at right angles and is fastened in a suitable manner as by welding to an electrode shank or bar extending laterally over the furnace structure, the three shanks being indicated, respectively, at 15', 16', and 17'. These shanks are connected in an appropriate manner to leads 15'', 16'', and 17'' from the secondary (not shown) of a transformer T connected to a source of three-phase alternating current. By suitable means such as a support 17ˣ and insulating strips 18, 19, and 20 associated therewith, the electrode shanks are held at their forward ends in a level position such that they are spaced upwardly from the underlying furnace structure. In the particular form shown, the top plate 13'' of the furnace jacket is cut away to form a recess 21 in that part adjacent which the electrode shanks are extended over the furnace wall, as shown in Fig. 1, but this particular arrangement is not essential.

It will be noted that in the preferred arrangement of the electrodes relative to the pot, as shown in Fig. 1, these electrodes are at the apices of a triangle, the middle electrode 16 being located in one of the corner portions of the pot (although spaced somewhat from the adjacent walls of the pot), and the electrodes 15 and 17 being symmetrically disposed with respect to electrode 16 to form the triangle referred to. In this particular case, all three of the electrodes are grouped so as to lie well on one side of a diagonal of the square pot, this being, as viewed in Fig. 1, a horizontal diagonal, and this is a preferred arrangement for obtaining a satisfactory heating and circulating of the salt bath by the three-phase current. It will also be noted that in the preferred form, as shown, the diagonals of the square pot are at right angles to the sides of the square furnace block or body and that the shank of middle electrode 16' is alined with one of the diagonals of the pot whereas the other two electrode shanks are arranged at slight angles to the middle electrode shank to provide a somewhat fanned out arrangement of the shanks from the electrodes, as by this arrangement the average spacing between adjacent electrode shanks is increased, thereby reducing hysteresis and eddy-current losses.

The temperature controlling arrangements provided in connection with the improved furnace include, in the form shown, a device generally indicated at 22, responsive to bath temperatures through the collection and concentration of heat rays from the bath upon a sensitive thermopile, this ray collecting device 22 containing the thermopile and the thermopile being connected through leads 23 and 24 to a pyrometer controller 25. The pyrometer controller is connected by leads 26 and 27 to leads 28 and 29 of a 110 volt circuit, and with a control switch 30 which is adapted to open and close the circuit supplying the transformer. The pyrometer controller 25 and the thermopile of device 22 are parts of a so-called potentiometer pyrometer of a well-known type which it is unnecessary to describe in detail, in which type of instrument the pyrometer controller has a relay switch which is controlled in its operation from the potential of the current generated in the thermopile. When the current generated in the thermopile reaches a certain value the relay switch is automatically opened by means common in these instruments, and when the voltage generated in the thermopile falls below this value the relay is closed. The controller or relay is connected to the main control switch 30 through the leads 26 and 27, and the arrangement is such that when the relay is closed the control switch is automatically closed, whereas when the relay is opened the main control switch is opened.

The ray collecting device 22 comprises a main casing portion 31 in which is contained the lens 32 and it also comprises the sighting tube 33 which has an open lower end 34 spaced upwardly somewhat from the upper surface of the bath. This tube 33 in connection with the lens 32 serves as a means for concentrating heat rays from the upper surface of the bath upon the thermopile 35, which, in this instance, is the target. In the case shown, the thermopile 35 is housed in the upper portion of the main casing 31 and this is the element which generates the electric current and transmits it to the controller 25 through the leads 23 and 24 previously mentioned.

In order to permit satisfactory mounting and adjustment of the device 22 relatively to the salt bath, it is preferred to employ a mounting such as shown in Figs. 1 and 2, this mounting including an angle bar 36 extending between and supported by supporting members 37 having foot portions 38 secured to the furnace body in a suitable manner as by being fastened by screws 39 to the top plate of the furnace jacket in locations adjacent the respective sides of the cutaway portion 21. The angle bar extends over and across the three electrode shanks in a location in which it is spaced upwardly from said shanks to an appreciable extent, as shown in Fig. 2. The device 22 is preferably attached to the angle bar or cross bar 36 by providing a clamping sleeve 40 which embraces and is clamped to the sighting tube 33 intermediate of the ends of the latter, said sleeve preferably being integrally attached to a bracket 41 extending laterally therefrom and supported by a flange 36ª which is a part of the angle bar 36 and extends in a forward direction so as to overhang the pot to some extent. Preferably, the bracket 41 is provided with longitudinal slots 42 through which pass screws 43 fastening the bracket to the angle bar in such a manner that the device 22 may be adjusted laterally to some extent relative to the bridge-like structure which supports it. Also, for the purpose of permitting the device 22 to have some vertical adjustment, the clamping sleeve is provided with clamping screws 44 which are in the nature of set screws having inner ends (not shown) which bear against the sighting tube so as to bind and secure it in the position to which it is adjusted.

It will be noted from Figs. 1 and 2 that the sighting tube is inclined slightly from its upper end in a downward and forward direction, this tube and the device 22 as a whole being preferably as shown, in alignment or approximate alignment with the middle electrode shank, and the lower end of the sighting tube being somewhat advanced relatively to the middle electrode (Fig. 2) and approximately in a line drawn between the axes of the side electrodes. This is a preferred arrangement making for compactness and minimum obstruction of the upper surface of the bath, but this arrangement can be modified under some conditions.

The lens 32 has adjusting means indicated at 45 by which it is adjustable axially of the casing 31 to vary its distance from the thermopile, and this adjusting means 45 can be of any preferred form and need not be described in detail. By the adjustment of the lens and by the axial adjustment of the device 22 upon its support, the heat rays from the upper surface of the bath can be concentrated in an optimum manner upon the thermopile.

Now, as the lower open end of the sighting tube is in rather close proximity to the upper surface of the salt bath there would be a possibility of vapors rising from the bath into the tube interfering with the passage of the heating rays and soiling or clouding the lens (the lower face of which is exposed in the upper portion of the tubular structure), were it not for the provision of means for overcoming these effects. In order to prevent these prejudicial conditions we provide means for keeping the sighting tube clear of salt fumes and like emanations from the bath, and the preferred means comprises provisions for circulating a current of clean air downwardly through the sighting tube so as to deflect the vapors that would otherwise pass up into the tube. In the arrangement which we have shown, a pipe 46 coming from a suitable source of compressed air is provided with a reducing valve 47 of any preferred construction, which is effective to reduce the air from an ordinary compressor to a lower pressure suitable for the purpose. After passing through this reducing valve, the air is passed into a cleaning device of any suitable type such as that indicated in the drawings at 48, this being a device for insuring that the air to be passed through the sighting tube is free of any oil or other contamination which might cloud the lens or otherwise interfere with the proper working of the device. From the cleaning device 48, which is shown as a filter, the air passes through a pipe 49 into the upper casing portion 31, as best shown in Fig. 3. The upper end portion of this casing part being closed, the air passes downwardly into and through the sighting tube, deflecting the vapors from the open lower end of the tube in the manner schematically illustrated in Fig. 5.

While the sighting tube 33 can, if desired, be constructed of suitable ceramic material, it is assumed that in the particular case shown this tube is of metal.

The air which is forced through the sighting tube not only has the function above described but also the additional function of cooling the furnace sighting tube which in operation of the furnace is subjected to an elevated temperature. The tube, if of metal, is constructed of a metal which will withstand this high temperature.

Heretofore, in salt bath furnaces it has been common practice to employ a thermocouple enclosed in an envelope of high melting point metal such as nickel or nickel-chrome alloy, immersed in the bath, or closed metal tubes have been immersed in the bath, said tubes being used in connection with thermopiles. A great deal of trouble and loss of production has been occasioned by the failure of the immersed envelope or tube subject to the heat of the surrounding bath liquid. When the envelope or tube fails, the pyrometer immediately ceases to function in the proper manner. These objections are overcome by the present invention in which a sighting tube with an open end is employed, the open end being at some distance above the level of the bath and means being provided for preventing the clouding of the lens by the fumes from the bath. Owing to the adjustability of the open tube end with respect to the bath level it is possible to adjust the open tube end in an upward and downward direction so as to bring it to that position wherein the heat rays are concentrated on the lens in a most effective way. This adjustability of the ray collecting tube relatively to the salt surface on which it is sighted is an important feature in obtaining the best operating results. The difficulties caused by the presence of foam and scum on the bath surface under the sighting tube can be obviated to a large degree by seeing to it that the tools and other articles which are to be treated in the bath are clean and free of substances likely to form foam or scum in such quantity as to interfere with the operation.

By our invention the inconvenience and loss of production heretofore occasioned by the employment of temperature responsive devices or detectors immersed in and surrounded by the fused salts is overcome, and repairs and break-downs are reduced to a minimum, although, on the other hand, the detector device operates very effectively and reliably and enables the temperature to be controlled within very close limits. The invention also provides a definitely improved arrangement of electrodes and detector in a salt bath furnace, the mounting of the tube from a bridge-like support above the bath in an adjustable manner providing definite advantages in assembly and operation of the parts. By locating the thermoresponsive device entirely outside of the bath some of the bath space is freed, and by an arrangement such as shown ample space is left adjacent the top of the pot for introduction and removal of the work.

While we have shown a preferred embodiment of the invention, it is understood that a wide range of embodiments can be used in carrying out the inventive idea, involving various changes in the organization of parts and in details without departure from the principles of the invention or the scope of the claims.

What we claim is:

1. A furnace for the heat treatment of metal, comprising a rectangular pot, a charge of salts therein, means for fusing the salts and maintaining them in fused condition including a source of heating current and electrodes immersed in the salt bath, means for controlling the temperature of said fusing means including a lens and an open-ended ray-collecting tube associated therewith having its lower open end spaced upwardly from the surface of the salt bath, and means for supplying a downward current of air to the interior of said tube so as to cool the same and maintain a clear sighting space between the upper surface of the bath and the lens, said electrodes, being three in number and located at the apices of a triangle at one side of the pot center with one electrode in a corner of the pot and said tube being arranged to overlie a space substantially between the other two electrodes.

2. A furnace for the heat treatment of metal articles, comprising a square pot, a salt bath in said pot, three spaced electrodes immersed in the bath, one being arranged within a corner portion of the pot, the other two being substantially in transverse alignment with each other, all three electrodes being within a space defined in part by a transverse diagonal of the pot, means connected to said electrodes for supplying them with alternating three-phase current, temperature controlling means for the furnace including an open-ended detector tube spaced upwardly from the bath surface and arranged between the electrodes which are substantially transversely aligned with each other, and means for maintaining the interior of said detector tube free of vapors from the bath.

3. In a salt bath furnace, the combination of a rectangular pot, a charge of salts therein which when fused form a salt bath, electrodes immersed in the bath and disposed in triangular arrangement at one side of a diagonal of the pot, one of said electrodes being located in a corner of the pot and the other two being in a plane extending transversely of the pot, supporting shanks extended over the wall of the pot and connected to said electrodes, a current source connected to said shanks, means for controlling the bath temperature including a downwardly pointed heat ray collecting tube having a lower open end spaced upwardly from the bath and arranged substantially over a space between the two last mentioned electrodes of the group, and a support for said tube in the form of a bridge member extended across and above the electrode shanks, said bridge member having its end portions attached to and supported from a part of the furnace at points adjacent the outer electrode shanks.

4. In a salt bath furnace, the combination of a rectangular pot, a charge of salts therein which when fused form a salt bath, electrodes immersed in the bath and disposed in triangular arrangement at one side of a diagonal of the pot, one of said electrodes being located in a corner of the pot and the other two being in a plane extending transversely of the pot, supporting shanks extended over the wall of the pot and connected to said electrodes, a current source connected to said shanks, means for controlling the bath temperature including a downwardly pointed heat ray collecting tube having a lower open end spaced upwardly from the bath and arranged substantially over a space between the two last mentioned electrodes of the group, and a support for said tube in the form of a bridge member extended across and above the electrode shanks, said bridge member having its end portions attached to and supported from a part of the furnace at points adjacent the outer electrode shanks, said tube being adjustable transversely and also axially relatively to said bridge member.

HAIG SOLAKIAN.
CHESTER M. VINCENT.

REFERENCES CITED

The following references are of record in the file of this patent:

UNITED STATES PATENTS

| Number | Name | Date |
|---|---|---|
| 1,782,482 | Seifert et al. | Nov. 25, 1930 |
| 1,864,885 | Bellis | June 28, 1932 |
| 2,054,382 | Larsen et al. | Sept. 15, 1936 |
| 2,145,677 | Adam, Jr. | Jan. 31, 1939 |
| 2,184,169 | Sordahl | Dec. 19, 1939 |
| 2,232,594 | Dike | Feb. 18, 1941 |
| 2,290,028 | Brooke | July 14, 1942 |
| 2,291,007 | Titcomb | July 28, 1942 |
| 1,438,381 | Keeney | Dec. 12, 1922 |
| 1,811,754 | Hultgren | June 23, 1931 |
| 2,267,593 | Lof | Dec. 23, 1941 |
| 2,275,265 | Mead | Mar. 3, 1942 |

FOREIGN PATENTS

| Number | Country | Date |
|---|---|---|
| 510,060 | Great Britain | July 26, 1939 |
| 63,295 | Norway | Mar. 3, 1941 |